United States Patent
Stefan et al.

(10) Patent No.: US 7,261,303 B2
(45) Date of Patent: Aug. 28, 2007

(54) SYSTEM AND METHOD FOR PREVENTING ROLLOVER

(75) Inventors: Kronung Stefan, Bloomfield, MI (US); Bernard De Mersseman, Royal Oak, MI (US); Heath Knight-Newbury, Brighton (GB); John A. Marcari, Lancing (GB)

(73) Assignee: Autoliv ASP, Inc., Ogden, UT (US)

( * ) Notice: Subject to any disclaimer, the term of this patent is extended or adjusted under 35 U.S.C. 154(b) by 181 days.

(21) Appl. No.: 10/718,234

(22) Filed: Nov. 20, 2003

(65) Prior Publication Data
US 2005/0110227 A1  May 26, 2005

(51) Int. Cl.
*B60G 17/015* (2006.01)

(52) U.S. Cl. ............. 280/5.5; 280/5.502; 280/124.106; 280/124.157; 280/755

(58) Field of Classification Search .................. 280/5.5, 280/5.502, 6.15, 755, 124.106, 124.157
See application file for complete search history.

(56) References Cited

U.S. PATENT DOCUMENTS

| | | | |
|---|---|---|---|
| 4,924,392 A | 5/1990 | Kurosawa | |
| 5,136,513 A | 8/1992 | Sol et al. | |
| 5,159,554 A | 10/1992 | Buma et al. | |
| 5,173,857 A | 12/1992 | Okuyama et al. | |
| 5,610,575 A | 3/1997 | Gioutsos | |
| 5,706,196 A | 1/1998 | Romstadt | |
| 5,944,763 A | 8/1999 | Iwasaki | |
| 6,038,495 A | 3/2000 | Schiffmann | |
| 6,157,879 A * | 12/2000 | Kwack et al. | 701/37 |
| 6,182,783 B1 * | 2/2001 | Bayley | 180/282 |
| 6,290,019 B1 | 9/2001 | Kolassa et al. | |
| 6,332,104 B1 * | 12/2001 | Brown et al. | 701/1 |
| 6,397,127 B1 | 5/2002 | Meyers et al. | |
| 6,397,133 B1 * | 5/2002 | van der Pol et al. | 701/37 |
| 6,477,466 B1 | 11/2002 | Kocherscheidt et al. | |
| 6,519,519 B1 | 2/2003 | Stopczynski | |
| 6,526,334 B1 | 2/2003 | Latarnik et al. | |
| 6,529,811 B2 * | 3/2003 | Watson et al. | 701/45 |
| 6,542,792 B2 * | 4/2003 | Schubert et al. | 701/1 |
| 6,584,388 B2 | 6/2003 | Schubert et al. | |
| 6,593,849 B2 | 7/2003 | Chubb et al. | |
| 6,600,414 B2 | 7/2003 | Foo et al. | |
| 6,604,745 B2 | 8/2003 | Piech | |
| 6,711,482 B2 * | 3/2004 | Shiino et al. | 701/37 |
| 2003/0100979 A1 | 5/2003 | Lu et al. | |

* cited by examiner

*Primary Examiner*—Eric Culbreth
(74) *Attorney, Agent, or Firm*—Sally J Brown; Brinks Hofer Glison & Lione

(57) ABSTRACT

A system and method for preventing a vehicle rollover is disclosed. The system includes a vehicle suspension unit and a programmable control unit. The vehicle suspension unit is located proximate to each of the vehicle road wheels for maintaining a predefined vehicle body height with respect to a road surface. The control unit is in communication with the vehicle suspension unit for actuating the vehicle suspension device after control unit has received a vehicle rollover notification signal to prevent vehicle rollover.

16 Claims, 4 Drawing Sheets

SYSTEM AND METHOD FOR PREVENTING ROLLOVER

TECHNICAL FIELD

The present invention relates to systems and methods for preventing rollover of a road vehicle.

BACKGROUND OF THE INVENTION

Over the past several years, vehicle rollover accidents have become an increasing concern. Vehicles having a higher center of gravity are especially susceptible to rolling over in certain conditions. For example, a vehicle such as a sports utility vehicle is more likely to roll over at high speeds through a sharp curve in the road than a passenger vehicle which has a lower center of gravity. Much work has been devoted to developing control algorithms for actuating vehicle stability control systems to prevent rollover. For example, some algorithms utilize vehicle yaw rate sensors to anticipate a rollover condition and actuate various vehicle actuation systems such as the braking system, the suspension system, the powertrain, etc. to prevent the rollover from occurring.

While these prior art systems and methods for controlling and preventing rollover have achieved their intended purpose, problems still exist. For example, the actuation of the various known vehicle systems in some cases is ineffective to mitigate or inhibit vehicle rollover.

Therefore, there exists a need for a new and improved vehicle rollover prevention system. Such a system should be quickly actuatable once a vehicle rollover algorithm has determined that the vehicle is likely to rollover.

BRIEF SUMMARY OF THE INVENTION

In an aspect of the present invention a system and method for mitigating or preventing rollover is provided. The system includes a plurality of vehicle suspension units and a programmable control unit. The vehicle suspension unit is located proximate to each of the vehicle road wheels to maintain a predefined vehicle body height with respect to a road surface. The control unit is in communication with the vehicle suspension units for controlling the actuation of the vehicle suspension units after the control unit has received a vehicle rollover notification signal from a rollover detection system.

In another aspect of the present invention the vehicle suspension unit includes an air bladder for raising or lowering the vehicle body.

In yet another aspect of the present invention the vehicle suspension unit includes a release valve in communication with the air bladder.

In yet another aspect of the present invention the release valve is a diaphragm actuated release valve that is in communication with the air bladder.

In still another aspect of the present invention the system further includes a diaphragm actuator valve in communication with the diaphragm actuated release valve for actuating the diaphragm actuated release valve.

In still another aspect of the present invention the system further includes an air reservoir in communication with the air bladder for injecting air into the air bladder to lower or raise the vehicle body.

In still another aspect of the present invention the control unit further includes executable program code for determining whether the vehicle is in a rollover condition and is likely to rollover.

DETAILED DESCRIPTION OF THE INVENTION

Figure 1:
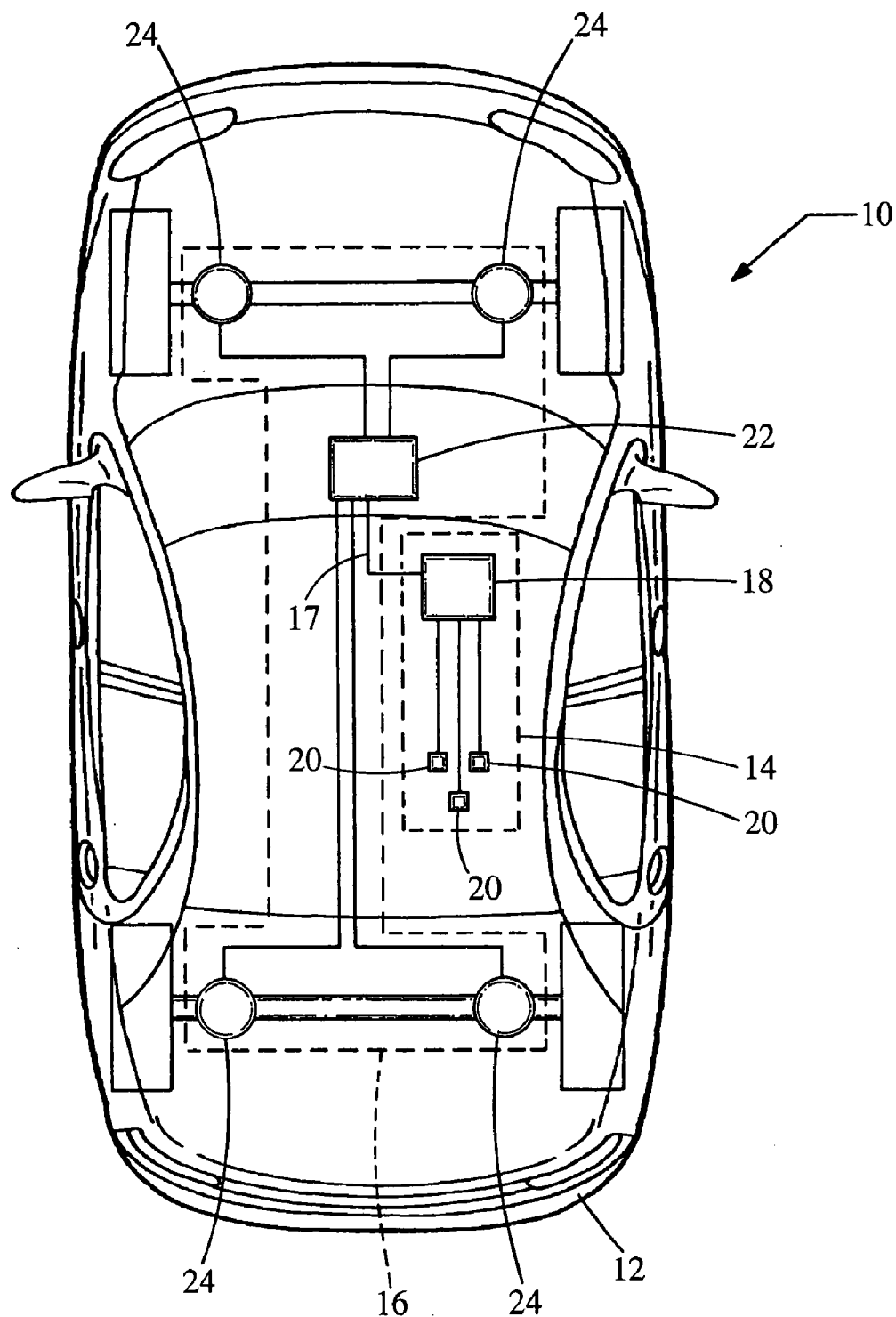
FIG. 1 is plan view of a vehicle having a rollover prevention system, in accordance with an embodiment of the present invention.

Referring now to FIG. 1, a plan view of a vehicle having a rollover prevention system 10 is illustrated, in accordance with an embodiment of the present invention. Vehicle rollover prevention system 10 is mounted in vehicle 12 and operates to determine whether vehicle 12 is likely to rollover and then actuates various system, actuators to prevent the vehicle from rolling over.

System 10 includes a rollover detection system 14 that is in communication with a rollover actuation system 16 via a notification signal line 17. Rollover detection system 14 includes a rollover detection module 18 in communication with various vehicle sensors 20. Further, rollover detection module 18 includes microprocessors and/or controllers for executing control logic to determine whether a rollover event is likely based on the received signals generated by the various vehicle sensors 20. The control logic, of course, may be implemented either in hardware or software. For example, executable code directed to rollover determination may be stored in electronic memory accessible by a microprocessor and initiated at vehicle ignition on. For an example of a suitable rollover determination algorithm for use with an embodiment of the present invention, see U.S. Pat. Nos. 6,038,495; 6,332,104; 6,397,133; 6,529,811; and U.S. Pat. No. 6,542,792, hereby incorporated by reference. Sensors 20 used to determine whether a rollover event is likely to occur include vehicle speed sensors, steering wheel angle sensors, roll and yaw rate sensors, lateral acceleration sensors, and the like.

Rollover detection system 14 generates the notification or detection signal along a communication link 17. The rollover actuation system 16 being connected to communication link 17 receives the notification signal. Rollover actuation system 16 includes an actuation control module 22 in communication with a plurality of vehicle suspension units 24. Actuation control module 22, which is also in communication with detection module 18, receives the detection or notification signal communicated via communication link 17 to initiate actuation of vehicle rollover actuation system 16.

Actuation control module 22 includes control logic for actuating vehicle suspension units 24 independently to effectuate rollover prevention. Actuation control module 22 may include control logic implemented through hardware, software or a combination of hardware and software. For example, actuation control unit 22 may include microprocessors and/or controllers that execute control algorithms for actuating suspension units 24.

Vehicle suspension units 24 may be any type of vehicle height adjustment actuators that are capable of quickly raising or lowering the body of vehicle 12 with respect to the ground. In a preferred embodiment of the present invention, vehicle suspension unit 24 is an air suspension unit that will be described in more detail below.

Figure 2:
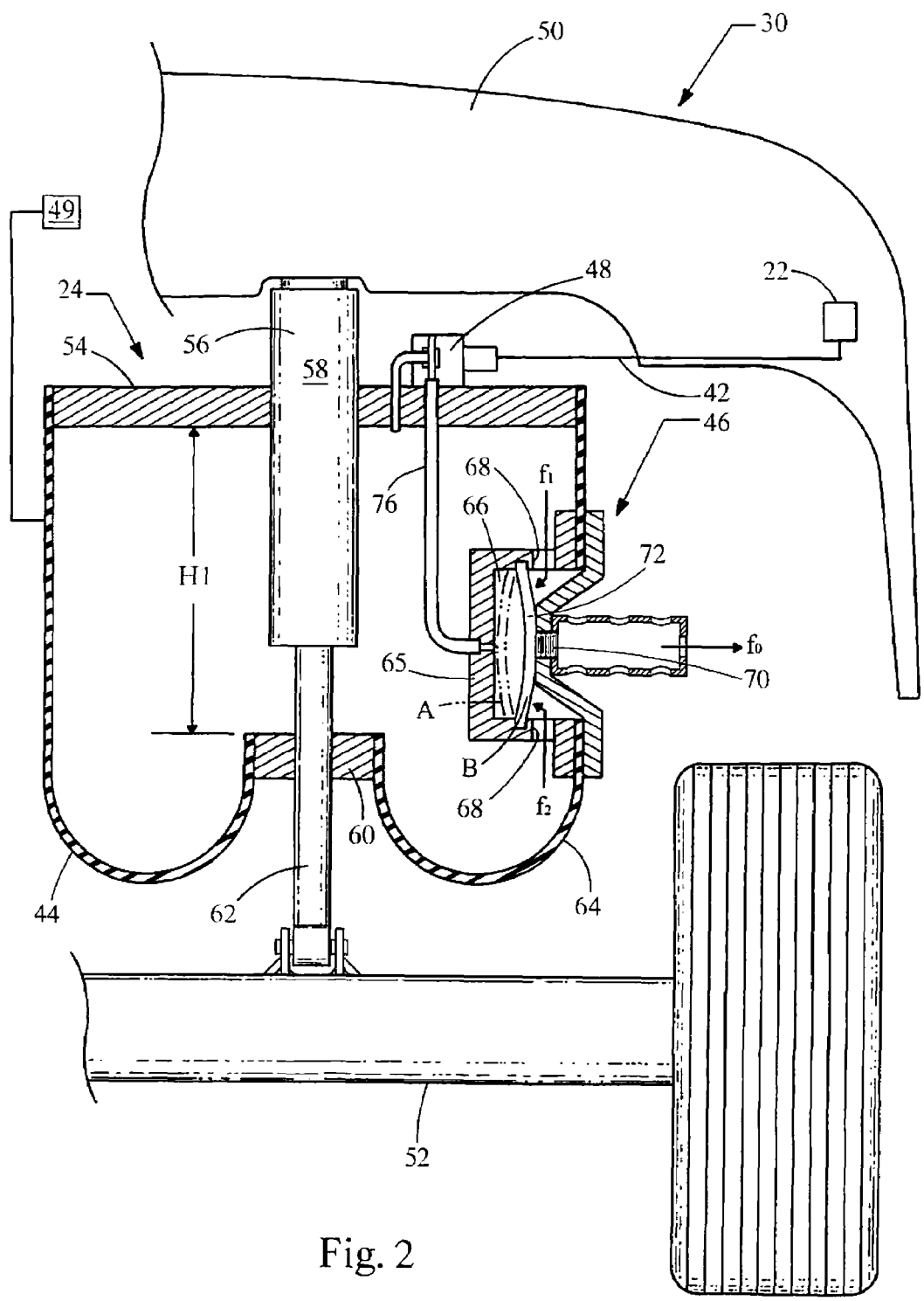
FIG. 2 is a schematic diagram of a vehicle suspension unit for controlling the height of the vehicle body with respect to the ground, in accordance with an embodiment of the present invention.

As illustrated in FIG. 2, in an embodiment of the present invention, vehicle suspension unit 24 includes a bladder 44, a pilot operated diaphragm valve (or quick exhaust valve) 46, and solenoid operated valve (or pilot valve) 48. Bladder 44 is a flexible air or fluid bladder that is positioned between a vehicle body 50 and a vehicle axle 52. More specifically, in an embodiment of the present invention an upper end 54 of bladder 44 is fixed to an upper portion 56 of a vehicle shock absorber 58 and a lower end 60 of bladder 44 is fixed to a lower portion 62 of shock absorber 58. As known in the art, lower portion 62 of shock absorber 58 is in turn connected to vehicle axle 52 and upper portion 56 of shock 58 is connected to vehicle body 50.

In operation, as air or fluid is injected by, for example, an air reservoir schematically shown at 49 into bladder 44 the distance between vehicle body 50 and vehicle axle 52 is increased, thereby raising the vehicle body 50 with respect to the ground. Conversely, as air or fluid is expelled from bladder 44 the distance between vehicle body 50 and vehicle axle 52 is decreased, thereby lowering the vehicle with respect to the ground. Vehicle suspension unit 24 would be provided in a similar fashion on each side of the front and rear of vehicle 12 proximate each front and rear wheels.

Pilot operated diaphragm valve 46 is fixed to an external wall 64 of bladder 44 and is configured to quickly release air or fluid from bladder 44 when solenoid valve 48 is actuated. An example of a quick release valve or diaphragm valve 46 that may be used with bladder 44 is an Asco Valve No. 8210G4 sold by Asco Valve, Inc., Florham Park, N.J. Diaphragm valve 46 includes a housing 65 and a diaphragm 72. Housing 65 defines a pressure chamber 66 and includes a pair of inlet ports 68 and an outlet port 70. When diaphragm 72 is in a first (or open) position, as designated by dashed lines A, an air or fluid flow path between inlet ports 68 and outlet port 70 is established. Thus, when diaphragm 72 is in an open position, as designated by dashed line A, air or fluid contained within bladder 44 is allowed to escape. Accordingly, when diaphragm 72 is in a second (or closed) position, designated by solid lines B, the flow path between inlet ports 68 and outlet port 70 is sealed off. Thus, when diaphragm 72 is in a closed position, as designated by solid line B, air or fluid contained within bladder 44 is prevented from escaping from bladder 44 and the body 50 of the vehicle remains at a predefined suspension height with respect to the ground.

Solenoid operated valve 48 is connected to actuation control module 22 via control line 42 for receiving a control signal to actuate valve 48. When solenoid operated valve 48 is actuated in response to the control signal, the air or fluid contained within diaphragm chamber 66 is released through pilot tube 76 causing diaphragm 72 to move from closed position B to open position A. When diaphragm 72 moves to open position A, fluid or air is released from bladder 44 allowing the bladder to depressurize. As the air or fluid is released from bladder 44, the body 50 of the vehicle is lowered with respect to the ground.

Figure 3:
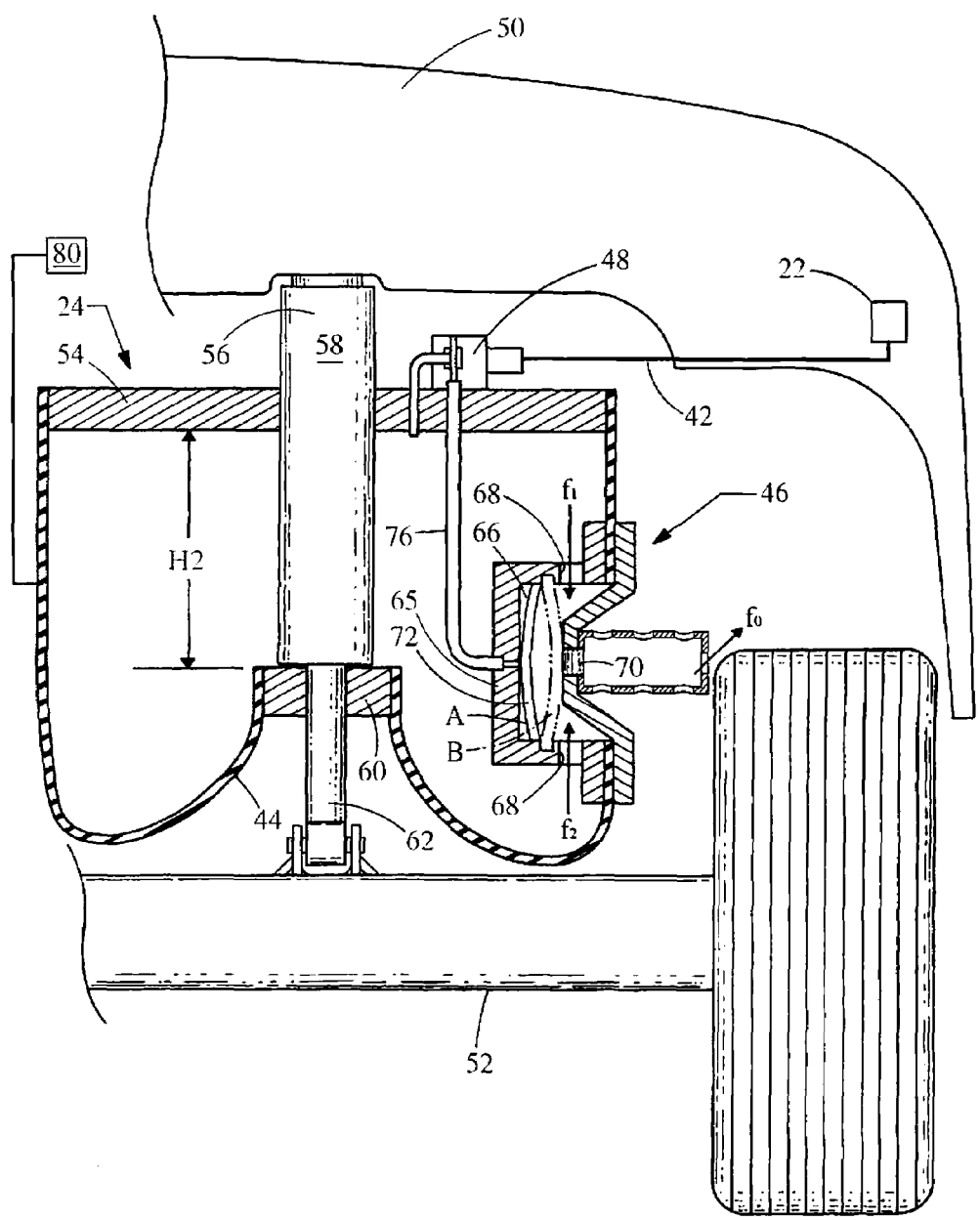
FIG. 3 is a schematic diagram of the vehicle suspension unit having an air bladder in a fully collapsed state, in accordance with an embodiment of the present invention.

In an initial inflated condition, as shown in FIG. 2, vehicle suspension unit 24 has a predefined height H1. Predefined height H1 provides a corresponding suspension height, as prescribed by the vehicle manufacturer for normal driving conditions. After a prescribed amount of air or fluid is released from bladder 44, as shown in FIG. 3, vehicle suspension unit 24 has a predefined height H2. Predefined height H2 is less than predefined height H1 and may be controlled to drop and thus rotate the body 50 of vehicle 12 counter to the direction of the rollover. Preferably, H2 is four to ten inches shorter than H1; however, H2 may be any desirable distance necessary to prevent the vehicle from rolling over.

Figure 4:
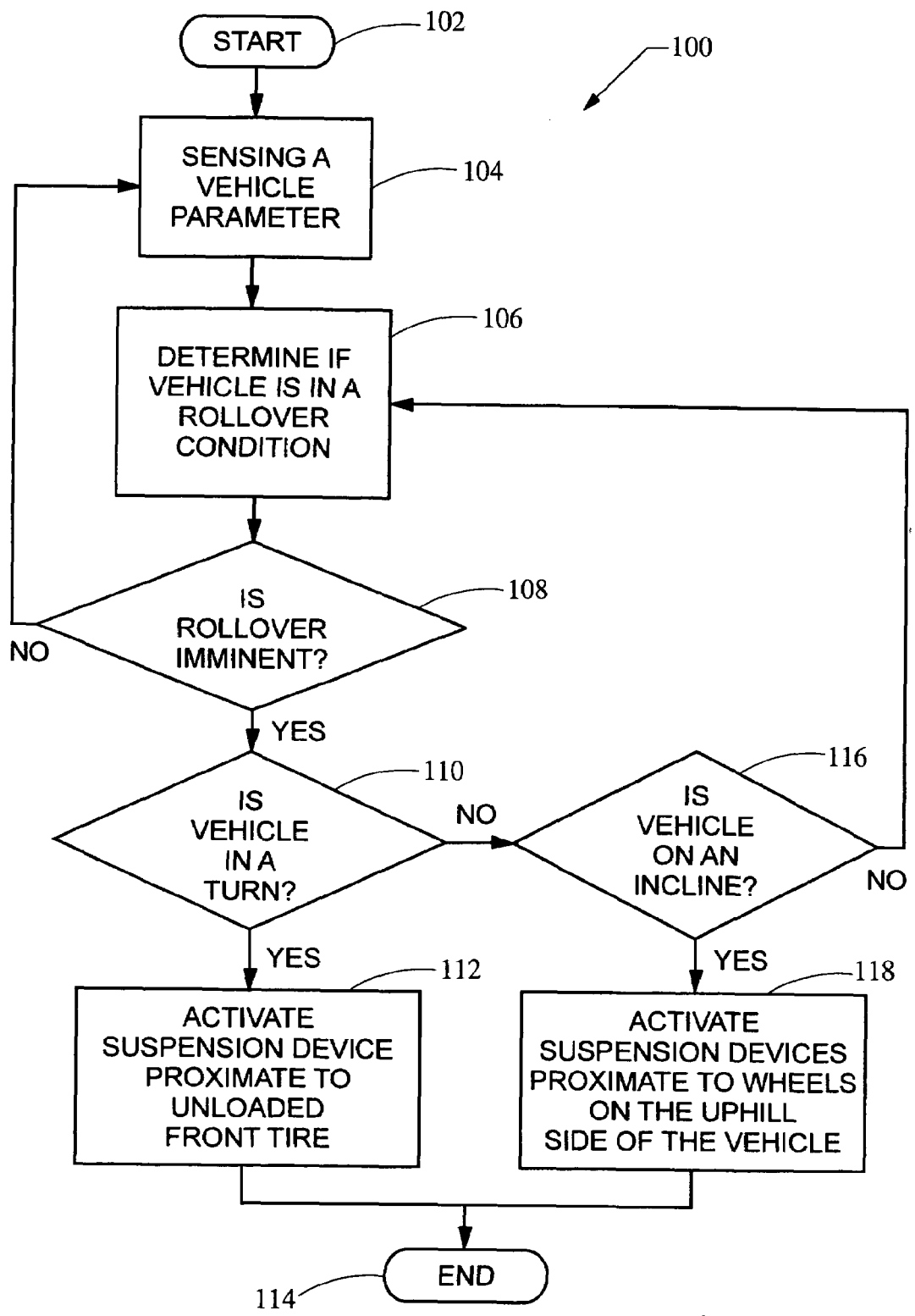
FIG. 4 is a flow diagram illustrating a method for actuating the rollover prevention system, in accordance with an embodiment of the present invention.

Referring now to FIG. 4, a method 100 for preventing vehicle rollover is illustrated, in accordance with the present invention. Method 100 starts at block 102 and, at block 104, a vehicle parameter and/or a plurality of vehicle parameters are sensed. The vehicle parameter may include a roll angular rate, a lateral acceleration, a yaw rate, a steering wheel angle, a height of the vehicle body with respect to the ground, a vehicle speed and the like. At block 106, the system of the present invention determines whether the vehicle is in a rollover condition. If the vehicle rollover is determined to be imminent, as represented by block 108, the method determines whether the vehicle is in a turn (or curve) in the road, as represented by block 110. If the vehicle is in a turn (or curve) in the road then the system activates the suspension unit that is proximate to the unloaded front tire, as represented by block 112. Of course, other suspension devices proximate to the other road wheels may be actuated in a controlled manner to minimize the likelihood of the rollover.

In operation a notification signal on line 42 activates solenoid valve 48 causing the valve to open. Upon the activation of solenoid valve 48, a flow path is opened between pilot tube 76 and atmosphere. As fluid or air is allowed to pass through pilot tube 76 and vented to the atmosphere, the pressure in cavity 66 is reduced. The reduced pressure in cavity 66 allows diaphragm 72 to spring into open position A. While in open position A, diaphragm 72 allows air to pass through valve inlet ports 68, as illustrated by arrows F1 and F2, and out outlet or exit port 70 (see FIG. 3). The flow of air out of exit port 70 is designated by arrow $F_0$. The imminent rollover condition being averted, the method terminates at block 114.

If, however, at block 110, the method determines that the vehicle is not in a turn and that the vehicle is on an incline, as represented by block 116, then the method activates the suspension units proximate to the wheels of the vehicle that are on the uphill side of the vehicle, as represented by block 118. In other words, the suspension units proximate to the wheels of the vehicle that will lose contact with the road surface first during vehicle rollover will be actuated and lowered. Alternatively or in conjunction with lowering the uphill side of the vehicle, the suspension units proximate to each wheel adjacent a downhill side of the incline may be raised. The control and activation of the suspension units would be conducted as described immediately hereinabove.

If, however, the method determines, at block 110 and 116, that the vehicle is not in a turn or on an incline, then the method returns to block 106. If however the method determines that a rollover is not imminent then the method returns to block 104, as represented by block 108.

In an alternate embodiment of the present invention, a pyrotechnic device schematically shown at 80 may be used to inflate bladder 44 of suspension unit 24. The pyrotechnic device 80 may be any device, such as those used in airbag inflation systems and seatbelt systems, which release a gas upon actuation. For example, a pyrotechnic device 80 that includes compressed liquefied argon or helium or any other cold compressed gas liquid may be used. Inflation of the bladder of suspension unit 24 is useful to prevent a rollover in certain vehicle driving conditions such as when the vehicle is on an incline. One or more of the bladders of the suspension units that are compressed due to the roll moment would be injected with the expanding gas from the pyrotechnic device 80.

As any person skilled in the art of systems and methods for preventing rollover of a road vehicle will recognize from the previous detailed description and from the figures and claims, modifications and changes can be made to the preferred embodiments of the invention without departing from the scope of this invention defined in the following claims.

We claim:

1. A system for preventing rollover of a road vehicle having a plurality of road wheels, the system comprising:
    a vehicle suspension device located proximate to each of the vehicle's road wheels for maintaining a predefined vehicle body height with respect to a road surface; and
    a control unit in communication with the vehicle suspension device and having executable code for controlling the actuation of the vehicle suspension device to lower a body of the vehicle to counteract a roll moment after the control unit has received a vehicle rollover notification signal, the vehicle suspension device including an air bladder for raising or lowering the vehicle body, and a release valve in communication with the air bladder, the release valve being a diaphragm actuated release valve that is in communication with the air bladder.

2. The system of claim 1 further comprising a diaphragm actuator valve in communication with the diaphragm actuated release valve for actuating the diaphragm actuated release valve.

3. The system of claim 1 further comprising an air reservoir in communication with the air bladder for injecting air into the air bladder to lower or raise the vehicle body.

4. The system of claim 1 further comprising a pyrotechnic device, in communication with the air bladder for injecting a gas into the bladder to raise the vehicle body.

5. The system of claim 1 wherein the control unit further comprises executable program code for determining whether the vehicle is in a rollover condition.

6. A method for preventing a vehicle having a plurality of wheels from rolling over, the method comprising:
    sensing a vehicle parameter;
    determining whether the vehicle is in a vehicle rollover condition based on the sensed vehicle parameter;
    determining a type of vehicle rollover condition based on the sensed vehicle parameter;
    actuating a vehicle suspension device to lower or raise a vehicle body based on the determined rollover condition to prevent the vehicle from rolling over;
    determining whether the vehicle is in a curve in a road;
    lowering a first side of the vehicle body by actuating the vehicle suspension device proximate to a wheel of the vehicle on a side of the vehicle where the vehicle body has been raised by vehicle roll;
    raising a second side of the vehicle body by actuating the vehicle suspension device proximate to the wheel of the vehicle on the side of the vehicle where the vehicle body has been lowered by vehicle roll; and
    injecting a fluid into the vehicle suspension device to raise the vehicle body.

7. The method of claim 6 wherein sensing a vehicle parameter further comprises sensing a roll angular rate.

8. The method of claim 6 wherein sensing a vehicle parameter further comprises sensing a vehicle body height with respect to a road surface.

9. The method of claim 6 wherein sensing a vehicle parameter further comprises sensing a lateral acceleration of the vehicle.

10. The method of claim 6 wherein actuating a vehicle suspension device further comprises releasing a fluid from the vehicle suspension device to lower the vehicle body.

11. The method of claim 6 wherein injecting a fluid into the vehicle suspension device to raise the vehicle body further comprises activating a pyrotechnic device to inject a gas into a bladder of the vehicle suspension device.

12. The method of claim 6 wherein determining the type of vehicle rollover condition further comprises determining whether the vehicle is on an incline.

13. The method of claim 12 wherein actuating a vehicle suspension device further comprises lowering the vehicle suspension device proximate to each of the plurality of wheels on the first side of the vehicle body adjacent an uphill side of the incline.

14. The method of claim 13 wherein actuating a vehicle suspension device further comprises releasing a fluid from the vehicle suspension device to lower the vehicle suspension device proximate to each of the plurality of wheels on the first side of the vehicle body adjacent an uphill side of the incline.

15. The method of claim 12 wherein actuating a vehicle suspension device further comprises raising the vehicle suspension device proximate to each of the plurality of wheels on the second side of the vehicle body adjacent to a downhill side of the incline.

16. The method of claim 15 wherein actuating a vehicle suspension device further comprises injecting a fluid into the vehicle suspension device to raise the vehicle suspension device proximate to each of the plurality of wheels on the second side of the vehicle body adjacent the downhill side of the incline.

* * * * *